Dec. 24, 1946.　　　　　W. H. WILSON　　　　　2,413,129
METHOD OF PACKING LEAFY VEGETABLES FOR SHIPMENT

Filed March 13, 1945

WILLIAM H. WILSON,
INVENTOR.

BY

ATTORNEY.

Patented Dec. 24, 1946

2,413,129

UNITED STATES PATENT OFFICE 2,413,129

METHOD OF PACKING LEAFY VEGETABLES FOR SHIPMENT

William H. Wilson, Los Angeles, Calif., assignor to Fruit & Vegetable Processing Co., Los Angeles, Calif., a corporation of California Application March 13, 1945, Serial No. 582,445

18 Claims. (Cl. 99—193)

This invention relates to methods of permitting leafy vegetables to retain their fresh appearance and condition during shipment. The invention is particularly directed to the treatment of leafy vegetables such as lettuce, endive, celery and cauliflower since these leafy vegetables are most often discolored during shipment. It has been observed that many of the leafy vegetables, and particularly lettuce, endive and romaine, become discolored in the region of the butt during shipment or storage. After the vegetable has been severed from its stem, the stem is generally white. This stem exudes moisture immediately after severance of the vegetable from the stem and within a relatively short period of time such stem end or butt of the vegetable begins to darken; such darkening eventually results in a rusty or brown discoloration which impairs the appearance of the vegetable and causes the purchaser to believe that the vegetable is not fresh. Moreover, it causes the purchaser to cut off and discard a portion of the vegetable. This discoloration not only affects the butt but in many instances it affects the ribs of the leafy portion of the vegetable, causing certain of the outer leaves to be discarded by the purchaser.

In Patent No. 2,215,446 a method of inhibiting the discoloration of the butt ends of certain vegetables is disclosed, such method including the step of covering the butt ends with an absorbent material containing an aqueous solution of a reducing agent. In actual practice, the absorbent material employed comprised a relatively thick sheet of absorbent paper similar to blotting paper in texture but weighing approximately 320 pounds per ream. Paper of this weight is about three times as thick as the ordinary blotting paper employed in blotting signatures and the like and adds considerable cost to the packing and treating operation, and its bulk and stiffness reduces the amount of ice which can be placed in a crate.

In the event the butt ends of lettuce are sprayed, swabbed or dipped with a suitable treating agent solution and the absorbent paper is not employed, then the crushed ice which is normally placed between layers of lettuce in a shipping crate melts during shipment and the melting ice washes away the treating agent. Accurate control is not attained and in many instances the darkening of the butts is not inhibited for a sufficient length of time to permit the lettuce to reach its destination in the undiscolored condition which is desired.

The present invention is directed toward a method of treating and packing leafy vegetables, particularly lettuce, whereby the excessive cost of the heavy absorbent material is eliminated, discoloration of the butts inhibited in a regulated and controlled manner for prolonged periods of time, and the amount of ice placed in a crate may be increased somewhat.

Generally stated, the method of the present invention is based upon the discovery that when the butt ends of lettuce are sprayed, dipped, swabbed or otherwise provided with an aqueous solution containing a desired treating agent and then such butts covered by a sheet of material which is substantially impervious to moisture, ice may be placed between layers of lettuce but such ice is then separated from the treated butts by means of the impervious sheet and does not wash away or dilute the treating agent.

The method of operation to which this invention is directed not only obviates the use of the expensive, heavy, absorbent material but in addition makes it possible to treat lettuce with materially smaller quantities of treating solution. Some of the heavy absorbent sheets used heretofore were capable of absorbing as much as eight ounces of solution per sheet whereas the method of the present invention permits the treatment of a layer of lettuce with as little as two ounces of treating solution. It is also possible to use a less concentrated solution when desired.

An object of the present invention, therefore, is to disclose and provide an improved economical controllable method of treating and packing leafy vegetables for shipment whereby discoloration of the butt ends thereof is inhibited for prolonged periods of time.

Another object of the invention is to disclose and provide an improved package or crate and means and methods whereby the discoloration of the butt ends of leafy vegetables may be inhibited during shipment.

Other objects, uses and advantages of the invention will become apparent to those skilled in this art from the following more detailed description of certain forms of the invention. In order to facilitate understanding, reference will be had to the appended drawing, in which.

Figure 1:
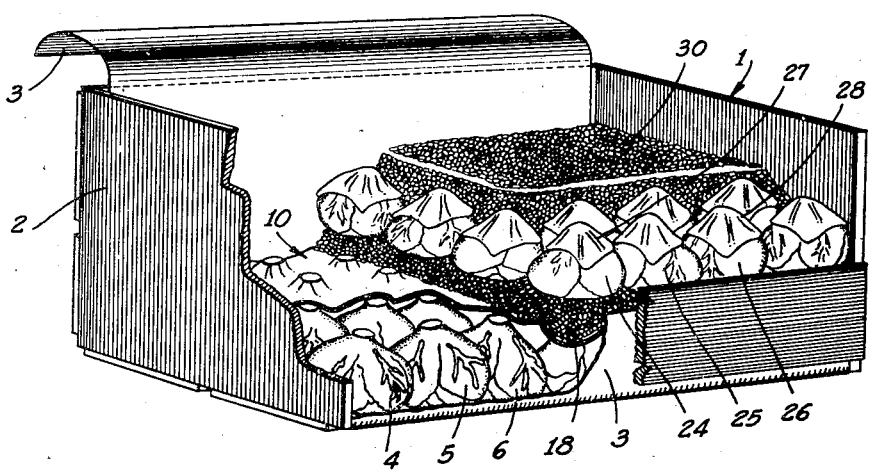
Fig. 1 is a perspective view broken away in sections of a crate of lettuce packed in accordance with some of the methods of this invention.

Fig. 1 illustrates a partially filled crate of lettuce. One end 2 of the crate 1 has been broken away. It will be noticed that in the illustrated form, the crate is lined with a sheet of material 3, the sheet 3 being ordinarily a relatively tough, moisture-resistant paper. A layer of lettuce is placed in this lined crate, the butts of the heads of lettuce being directed upwardly. Heads of lettuce in this layer are indicated as 4, 5 and 6.

In accordance with the present invention, the butt or stem ends of the lettuce are treated with a substance capable of inhibiting the discoloration of such butts. Various treating agents may be employed. In most cases, suitable treating agents in aqueous solution are employed and such treating solutions may be applied to the butt ends of the layer of lettuce by spraying the entire layer, by swabbing the butts, or in any other desired manner.

Since this layer of lettuce will be covered with a layer of crushed ice, I have provided means whereby the ice is separated from the lettuce butts.

After the layer of lettuce has been placed in the crate it may be covered by a sheet of material, generally indicated at 10. This sheet of material may be of substantially the same size as the horizontal dimensions of the box. Preferably the sheet material 10 is substantially impervious to moisture or includes a component layer of coating which is substantially impervious to moisture.

Sheet material eminently suited for use in this invention may comprise a sheet of paper provided with a moisture-resistant or impervious coating or layer. Oiled papers, parchmentized papers, waxed papers, Cellophane or other fibrous sheets resistant to moisture may be employed. When such water-resistant or impervious sheets are employed the treating agent is applied to the upstanding butts of the underlying layer of lettuce by swabbing or spraying the same before the sheet is applied. In some instances, however, the aqueous treating solution may include a surface tension reducing agent or wetting agent so that the waxy or oily non-wettable sheet may be dipped in the solution of treating agent and wetting agent so as to form a wet film of solution on such sheet and the sheet then placed over the upstanding butts of lettuce. When this mode of operation is being employed, the preliminary spraying, swabbing or dipping of the lettuce is unnecessary, since the wetted sheet 10 will carry the solution and thus bring it into contact with the butt ends of the lettuce.

Figure 2:
Figs. 2, 3 and 4 are enlarged diagrammatic representations of transverse sections through various forms of sheet material adapted for use in the practice of the invention.
Figure 3:
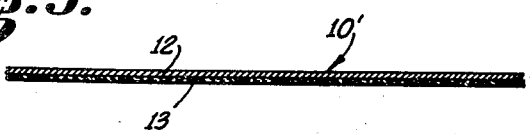

An enlarged view of such impervious sheet wetted with a treating solution is shown in Fig. 2.

Instead of employing a sheet such as is indicated at 10, a sheet 10' may be employed, such sheet including as a component layer a coating 12 which is impervious or moisture-resistant, the body of the paper or the adjacent layer thereof, such as the layer 13, being relatively absorptive. The sheet 10' could therefore be dipped in an aqueous treating solution so as to saturate the layer 13 thereof and then placed over the layer of lettuce with the layer 13 in contact with the butts.

Figure 4:
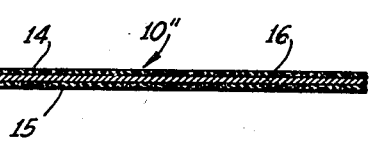

The use of sheet material such as is indicated at 10' requires the operator to make certain that the absorptive layer 13 is placed in contact with the lettuce and in order to eliminate accidental misplacement of such sheet, the sheet material may take the form illustrated in Fig. 4, wherein such sheet is now identified as 10". It will be noted that this laminated sheet 10" is provided with two surface layers 14 and 15 which are relatively absorptive and includes as an integral inner layer a moisture-impervious substance or material 16. The sheet 10" can therefore be sprayed, dipped or wetted with a treating solution and placed over the layer of lettuce and it would not make any difference whether the side 14 or 15 is in contact with the lettuce since both of said sides contain the treating solution.

After the layer of lettuce has been covered by one of the sheets 10, 10' or 10" as stated hereinabove, a layer of crushed ice is placed thereover. Such layer of crushed ice is indicated at 18. During shipment, moisture from the melting ice 18 will not pass through the sheet 10, 10' or 10" and therefore will not wash away or dilute the aqueous treating solution which has been applied to the butts of the lettuce 4, 5, 6, etc.

It is to be remembered that when lettuce is shipped to distant points of consumption, it must be kept under refrigerated conditions. The crushed ice 18 maintains the desired conditions around the lettuce. Such ice may be crushed to various degrees of fineness and in some instances the ice is reduced to a state of such fine division that it can be handled and molded like snow. The term "crushed ice" as used herein shall refer to ice in any crushed or subdivided condition capable of use in packing lettuce or the like.

A second layer of lettuce is then placed on the crushed ice 18 and treated in the manner described hereinabove for the lower layer. In some instances, however, instead of employing a single sheet, such as the sheet 10, which sheet is in contact with all of the butts of the layer of lettuce, it is desirable to modify the procedure and use a separate impervious sheet to cover the butt of each lettuce. In Fig. 1 the second layer of lettuce in the crate, including the heads 24, 25 and 26, is shown resting on the layer of crushed ice 18 with butt ends up, each butt being covered by a separate sheet of moisture-resisting material. For example, the lettuce 24 has its butt covered with the sheet 27 whereas lettuce 26 has its butt covered with the sheet 28. These sheets 27, 28, may correspond in characteristics to those previously described as the characteristics of sheet 10, 10' or 10".

Any relatively flexible sheet material which is substantially impervious to the transmission of water may be employed and waxed, oiled, parchmentized, laminated or coated papers, certain grades of Cellophane, papers containing high quantities of rosin or other sizing materials or including thermoplastic materials, polymerized vinyl halides or the like, or thin sheets of thermoplastic materials per se may be cited as examples.

Although Fig. 1 shows relatively small sheets 27 and 28 applied to the butts of the lettuce, in many instances it is desirable that the sheets be sufficiently large so as to not only cover the butt but also permit the sheet to cover most of the lettuce, so as to extend down to the underlying ice layer 18. This modification of the invention not only permits the butts to retain their natural coloring but in addition tends to enhance the attractiveness and salability of the lettuce, particularly when the sheets 27 and 28 are transparent. Bag-like containers from transparent material, adapted to receive one or more heads of lettuce, may be employed instead of the individual sheets 27 and 28.

Ordinarily, three layers of lettuce are placed in a crate but only two such layers are shown.

The second layer, involving lettuce 24, 25 and 26, when treated in the manner stated, may then be covered with a layer of crushed ice 30 and another layer of lettuce placed thereon.

The modification shown in the drawing and employed in the second layer of lettuce also permits the use of larger quantities of ice than is the case when one continuous sheet, such as the sheet 10, is employed. The presence of larger quantities of ice more positively assures thorough refrigeration during shipment.

Instead of sprinkling or spraying the lettuce with the treating solution after said lettuce has been placed in a crate, the lettuce may be sprayed with treating solution prior to being placed in the crate. For example, after being trimmed the lettuce may be washed and sprayed with a solution as it moves on a conveyor from the trimming tables to the packing stations. Instead of spraying, the lettuce may be dipped in the solution or swabbed therewith. It is not necessary to take special precautions to prevent the solution from contacting the outer ribs of the lettuce since the application of the treating agent to the entire bottom portion of the lettuce including the lower ribs, is not detrimental but instead appears to prevent the ribs from showing the discoloration normally produced during shipment.

As stated hereinbefore, various reagents may be employed in inhibiting discoloration of the butts. As examples of such reagents, reference may be had to water-soluble, substantially non-toxic reducing agents such as water-soluble salts of thiosulfuric, pyrosulfurous, sulfurous and hyposulfurous (hydrosulfurous) acids. Thiourea is another reducing agent capable of being employed. More specifically, sodium thiosulfate, sodium hyposulfite, sodium metabisulfite, corresponding water-soluble potassium, magnesium and calcium salts and mixtures thereof may be cited. It is to be noted that when sodium metabisulfite ($Na_2S_2O_5$) is added to water, it assumes the form of the bisulfite ($NaHSO_3$) and to the best of my knowledge, metabisulfite does not exist as $Na_2S_2O_5$ in aqueous solution. The bisulfite, therefore, is the active treating agent in such solution.

When sodium bisulfite is used as the treating agent, the solution may preferably contain from about 0.7% to about 1.2% by weight. In the event the sheet of material is impervious to the transmission of water therethrough, then in accordance with the present invention the aqueous solution of treating agent will contain a wetting agent. As an example of a solution capable of being used with waxed or other normally non-wettable sheets, I have obtained good results by the use of an aqueous solution containing about 1% of sodium bisulfite by weight and 0.2% or 0.3% by weight of a wetting agent such as Aerosol (diocetyl ester of sodium sulfosuccinate, made by American Cyanamid Corporation), or Naccanol (alkyl aryl sodium sulfonate made by National Aniline & Chemical Co.).

Such solutions will wet the water-impervious, normally non-wettable sheets, producing a film of solution thereon, which wetted sheets may then be applied to the butt ends of lettuce or other leafy vegetables and concurrently supply an inhibiting agent to such butts and protect the butts from the leaching action of water from melting ice during shipment.

It is to be noted that during shipment or storage the lettuce should be maintained under refrigerated conditions in order to assure best results.

It is to be understood that the process hereinabove described may be applied to one or all layers of lettuce in a crate. When waxy, smooth or coated papers are employed above the upper layer of lettuce, there is a tendency for the crushed ice to slip off the upper surface of such sheet, making it difficult to maintain a layer of crushed ice on the upper surface of such sheet during the final steps of packaging and nailing the crate. In order to overcome this difficulty, it has been found desirable to employ a sheet which is provided with a roughened, corrugated or dimpled surface. Sheets of waxed or coated paper provided with spaced protuberances on the upper surface (such protuberances corresponding to depressions molded into the lower surface of the sheet) have been found satisfactory. In a specific instance the dimples or protuberances on the upper surface of such impervious sheet were approximately 1/8" in diameter, extended about 1/16" above the upper surface of the sheet and were spaced about 1" apart. Obviously, protuberances in other sizes, spacings or arrangements may be employed as effectively. The roughened upper surface thus produced, however, prevents the crushed ice from slipping off the cover sheet and facilitates the packing of the crate.

This application is a continuation-in-part of application Serial No. 363,816, filed November 1, 1940.

Those skilled in the art will appreciate that various changes and modifications may be made from the examples given herein without departing from the spirit of the invention. As pointed out previously, the method of packing herein disclosed permits the treating agent to be retained in contact with the butt of the lettuce, the sheet material protecting the treating agent on the butt from leaching action of melting ice and in some instances acting as a carrier for the treating agent, thereby bringing and maintaining the treating agent in contact with the butt. All changes and modifications coming within the scope of the appended claims are embraced thereby.

I claim:

1. In a method of packing lettuce for shipment, the steps of: forming a layer of lettuce in a crate, contacting the butts thereof with a sheet of material carrying an aqueous solution of a discoloration-inhibiting agent, said sheet material including a component layer which is substantially impervious to moisture; and placing crushed ice in heat-exchange relationship to said lettuce but separated from the butts by said sheet material, whereby said sheet material supplies discoloration-inhibiting agent to the butts and restrains water derived from melting ice from washing the agent away during shipment.

2. In a method of packing lettuce for shipment, the steps of: forming a layer of lettuce in a crate, contacting each butt with a sheet of material carrying an aqueous solution of a discoloration-inhibiting agent, said sheet material including a substantially moisture-impervious coating; and placing crushed ice in heat-exchange relationship to said lettuce but separated from the butts by said sheet material.

3. In a method of packing lettuce for shipment, the steps of: placing lettuce in a crate to form a layer thereof, wetting sheet material having a component layer which is substantially impervious to moisture with an aqueous solution of a discoloration-inhibiting treating agent, applying said sheet material to the layer of lettuce to supply said aqueous solution to said butts, and placing crushed ice in heat-exchange relationship to said lettuce but separated from the butts by said sheet material, said sheet material protecting the butts and treating agent supplied thereto from washing with water derived from melting ice during shipment.

4. As an article of commerce, a crate of leafy vegetables from the group consisting of lettuce, romaine, chicory and endive, said crate comprising layers of vegetables with intervening layers of crushed ice, the butt ends of at least some of said vegetables carrying a discoloration-inhibiting agent, said butts being separated from the crushed ice by sheet material substantially impervious to the transmission of moisture therethrough, whereby water from melting ice will not wash away the discoloration-inhibiting agent during shipment of the vegetables.

5. In a method of packing leafy vegetables from the group consisting of lettuce, romaine, chicory and endive, the steps of: placing said vegetables having their butt ends treated with a discoloration-inhibiting agent in a crate in heat-exchange relation to crushed ice in said crate, and separating the butts from the crushed ice by means of sheet material substantially impervious to transmission of moisture therethrough, whereby water from melting crushed ice is inhibited from washing the butts to remove the discoloration-inhibiting agent.

6. In a method of packing leafy vegetables from the group consisting of lettuce, romaine, chicory and endive, the steps of: forming a layer of said vegetables in a crate, placing a sheet of material carrying an aqueous solution of a discoloration-inhibiting agent from the group consisting of water-soluble salts of thiosulfuric, pyrosulfurous, sulfurous and hyposulfurous acids and thiourea, in contact with butts of said vegetables, said sheet of material being substantially impervious to the transmission of moisture therethrough, and placing crushed ice in heat-exchange relation to said vegetables in said crate, said sheet material separating the crushed ice from the butts of said vegetables, said sheet material protecting the butts and treating agent supplied thereto from washing with water derived from melting ice during shipment.

7. In a method of packing lettuce, the steps of: forming a layer of lettuce in a crate, placing a sheet of material carrying an aqueous solution of a discoloration-inhibiting agent from the group consisting of water-soluble salts of thiosulfuric, pyrosulfurous, sulfurous and hyposulfurous acids and thiourea, in contact with butts of said lettuce, said sheet of material being substantially impervious to the transmission of moisture therethrough, and placing crushed ice in heat-exchange relation to said lettuce in said crate, said sheet material separating the crushed ice from the butts of said lettuce.

8. In a method of packing leafy vegetables from the group consisting of lettuce, romaine, chicory and endive, the steps of: forming a layer of said vegetables in a crate, contacting the butts thereof with a sheet of material substantially impervious to transmission of moisture therethrough, said sheet carrying a film of aqueous solution of a discoloration-inhibiting agent, and placing crushed ice in heat-exchange relationship to said vegetables, said crushed ice being separated from the butts thereof by said sheet material.

9. In a method of packing lettuce for shipment, the steps of: forming a layer of lettuce in a crate; placing a small sheet of material carrying an aqueous solution of a discoloration-inhibiting agent from the group consisting of water-soluble salts of thiosulfuric, pyrosulfurous, sulfurous and hyposulfurous acids and thiourea, in contact with the butt of each lettuce to supply said agent thereto, said sheets being substantially impervious to the transmission of moisture therethrough, and placing crushed ice in the crate in heat-exchange relationship to the lettuce, said sheets protecting the butts and the agent supplied thereto from washing with water derived from melting ice during shipment.

10. In a method of packing lettuce for shipment, the steps of: forming a layer of lettuce in a crate, contacting the butts thereof with a sheet of material carrying an aqueous solution of a discoloration-inhibiting agent from the group consisting of water-soluble salts of thiosulfuric, pyrosulfurous, sulfurous and hyposulfurous acids and thiourea, said sheet material including a component layer which is substantially impervious to moisture, and placing crushed ice in heat-exchange relationship to said lettuce but separated from the butts by said sheet material.

11. In a method of packing lettuce for shipment, the steps of: forming a layer of lettuce in a crate, contacting each butt with a sheet of material carrying an aqueous solution of a discoloration-inhibiting agent from the group consisting of water-soluble salts of thiosulfuric, pyrosulfurous, sulfurous and hyposulfurous acids and thiourea, said sheet material including a substantially moisture-impervious coating, and placing crushed ice in heat-exchange relationship to said lettuce but separated from the butts by said sheet material.

12. In a method of packing lettuce for shipment, the steps of: moistening an absorptive sheet provided with a layer of material substantially impervious to moisture with an aqueous solution of a discoloration-inhibiting agent, placing such moistened sheet over the butts of lettuce with the absorptive moistened portion of the sheet against the butts, and placing crushed ice in heat-exchange relationship to said lettuce but separated from the butts by said sheet material.

13. In a method of packing lettuce for shipment, the steps of: moistening an absorptive sheet provided with a layer of material substantially impervious to moisture with an aqueous solution of a discoloration-inhibiting agent from the group consisting of water-soluble salts of thiosulfuric, pyrosulfurous, sulfurous and hyposulfurous acids and thiourea, placing such moistened sheet over the butts of lettuce with the absorptive moistened portion of the sheet against the butts, and placing crushed ice in heat-exchange relationship to said lettuce but separated from the butts by said sheet material.

14. In a method of packing lettuce for shipment, the steps of: placing lettuce in a crate to form a layer thereof, wetting sheet material having a component layer which is substantially impervious to moisture with an aqueous solution of a discoloration-inhibiting treating agent from the group consisting of water-soluble salts of thiosulfuric, pyrosulfurous, sulfurous and hyposulfurous acids and thiourea, applying said sheet material to the layer of lettuce to supply said aqueous solution to said butts, and placing crushed ice in heat-exchange relationship to the lettuce but separated from the butts thereof by said sheet material.

15. In a method of packing lettuce for shipment, the steps of: placing lettuce in a crate to form a layer thereof, wetting sheet material having a component layer which is substantially impervious to moisture with an aqueous solution containing a wetting agent and a discoloration-inhibiting treating agent, the treating agent being from the group consisting of water-soluble salts of thiosulfuric, pyrosulfurous, sulfurous and hyposulfurous acids and thiourea, applying said sheet material to the layer of lettuce to supply said aqueous solution to said butts and placing crushed ice in heat-exchange relationship to said lettuce but separated from the butts thereof by said sheet material.

16. In a method of packing leafy vegetables from the group consisting of lettuce, romaine, chicory and endive, the steps of: moistening a sheet of material substantially impervious to moisture with an aqueous solution of a wetting agent and a discoloration-inhibiting agent, placing such moistened sheet over the butts of leafy vegetables to supply said inhibiting agent thereto, and placing crushed ice in heat-exchange relationship to said leafy vegetables but separated from the butts thereof by said sheet material.

17. In a method of packing leafy vegetables from the group consisting of lettuce, romaine, chicory and endive, the steps of: moistening a sheet of material substantially impervious to moisture with an aqueous solution of a wetting agent and a discoloration-inhibiting agent from the group consisting of water-soluble salts of thiosulfuric, pyrosulfurous, sulfurous and hyposulfurous acids and thiourea, placing such moistened sheet over the butts of leafy vegetables to supply said inhibiting agent thereto, and placing crushed ice in heat-exchange relationship to said leafy vegetables but separated from the butts thereof by said sheet material.

18. In a method of packing lettuce, the steps of: moistening a sheet of material substantially impervious to moisture with an aqueous solution of a wetting agent and a discoloration-inhibiting agent from the group consisting of water-soluble salts of thiosulfuric, pyrosulfurous, sulfurous and hyposulfurous acids and thiourea, placing such moistened sheet over the butts of lettuce to supply said inhibiting agent thereto, and placing crushed ice in heat-exchange relationship to said lettuce but separated from the butts thereof by said sheet material.

WILLIAM H. WILSON.